United States Patent
Jin

(10) Patent No.: US 11,280,269 B2
(45) Date of Patent: Mar. 22, 2022

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventor: Heonseop Jin, Changwon-si (KR)

( * ) Notice: Subject to any disclaimer, the term of this patent is extended or adjusted under 35 U.S.C. 154(b) by 359 days.

(21) Appl. No.: 16/451,001

(22) Filed: Jun. 24, 2019

(65) Prior Publication Data

US 2020/0056545 A1 Feb. 20, 2020

(30) Foreign Application Priority Data

Aug. 17, 2018 (KR) .................. 10-2018-0096173

(51) Int. Cl.
F02C 7/22 (2006.01)
F23R 3/34 (2006.01)
F23R 3/28 (2006.01)

(52) U.S. Cl.
CPC .............. F02C 7/222 (2013.01); F23R 3/286 (2013.01); F23R 3/34 (2013.01); F05D 2220/32 (2013.01); F05D 2260/30 (2013.01)

(58) Field of Classification Search
CPC .... F23R 3/16; F23R 3/60; F23R 3/286; F23R 3/12; F23R 3/04; F02D 2220/32; F05D 2260/30; F05D 2220/32
See application file for complete search history.

(56) References Cited

U.S. PATENT DOCUMENTS

| | | | |
|---|---|---|---|
| 5,983,642 A | 11/1999 | Parker et al. | |
| 8,438,852 B2 | 5/2013 | Valeev et al. | |
| 11,054,138 B2* | 7/2021 | Cho | F23R 3/14 |
| 11,060,728 B2* | 7/2021 | Seok | F02C 3/30 |
| 11,060,729 B2* | 7/2021 | Roh | F23R 3/34 |
| 11,073,283 B2* | 7/2021 | Park | F23R 3/002 |
| 2004/0050057 A1 | 3/2004 | Bland et al. | |
| 2010/0146980 A1* | 6/2010 | Strom | F02K 1/825 60/770 |
| 2014/0366541 A1* | 12/2014 | Jensen | F23R 3/286 60/734 |
| 2017/0074519 A1* | 3/2017 | Abe | F23R 3/10 |

FOREIGN PATENT DOCUMENTS

| | | |
|---|---|---|
| KR | 10-0254274 B1 | 5/2000 |
| KR | 1020130041207 A | 4/2013 |

OTHER PUBLICATIONS

KR Decision to Grant dated Mar. 16, 2020.

* cited by examiner

Primary Examiner — Todd E Manahan
Assistant Examiner — Rodolphe Andre Chabreyrie
(74) Attorney, Agent, or Firm — Harvest IP Law, LLP

(57) ABSTRACT

A combustor and a gas turbine capable of stably supporting a fuel peg and guiding the flow of air are provided. The combustor may include: a plurality of nozzles configured to eject fuel and air; a flow passage configured to guide a flow of air to be drawn into the nozzles; a plurality of fuel pegs configured to protrude into the flow passage, each of the plurality of fuel pegs including an injection hole through which fuel is discharged; and a peg support configured to be coupled to the fuel pegs to support the fuel pegs.

17 Claims, 8 Drawing Sheets

COMBUSTOR AND GAS TURBINE INCLUDING THE SAME

CROSS-REFERENCE TO RELATED APPLICATION

This application claims priority to Korean Patent Application No. 10-2018-0096173, filed on Aug. 17, 2018, the entire disclosure of which is incorporated herein by reference in its entirety.

BACKGROUND

Field

Apparatuses and methods consistent with exemplary embodiments relate to a combustor and a gas turbine including the combustor.

Description of the Related Art

A gas turbine is a power engine configured to mix fuel with an air compressed by a compressor, combust the mixture of the fuel and the compressed air, and rotate a turbine using a high-temperature gas generated by the combustion. Gas turbines are used to drive a generator, an aircraft, a vessel, a train, and so forth.

Generally, gas turbines include a compressor, a combustor, and a turbine. The compressor draws an external air thereinto, compresses the air, and then transmits it to the combustor. Air compressed by the compressor enters a high-pressure and high-temperature state. The combustor mixes fuel with compressed air supplied from the compressor, and combusts the mixture of the fuel and the compressed air. Combustion gas generated by the combustion is discharged to the turbine. Turbine blades provided in the turbine are rotated by the combustion gas, whereby power is generated. Generated power may be used in various fields, e.g., for generating electricity, driving a mechanical device, etc.

Air compressed by the compressor is supplied to the combustor. Air drawn into the combustor flows along an interior of the nozzle casing and is drawn into a nozzle. Here, after the air has been supplied toward a nozzle end plate, a flow path of the air is bent in a reverse direction, and the air is supplied to an end of the nozzle by which combustion is performed.

As such, because the direction of the flow of air for combusting fuel is rapidly changed on the nozzle end plate, strong swirls may be generated during this process. In strong swirls, there are a lot of speed components biased in a direction misaligned with an intended flow direction or in a reverse direction. Consequently, the swirls cause pressure loss, thus reducing efficiency in the flow of air.

Furthermore, a fuel peg which protrudes into a nozzle casing ejects fuel toward air drawn into the nozzle to form a pre-mixed air. The fuel peg is problematic in that it is vulnerable to vibration.

SUMMARY

Aspects of one or more exemplary embodiments provide a combustor and a gas turbine capable of stably supporting a fuel peg and guiding the flow of air.

Additional aspects will be set forth in part in the description which follows and, in part, will become apparent from the description, or may be learned by practice of the exemplary embodiments.

According to an aspect of an exemplary embodiment, there is provided a combustor including: a plurality of nozzles configured to eject fuel and air; a flow passage configured to guide a flow of air to be drawn into the nozzles; a plurality of fuel pegs configured to protrude into the flow passage, each of the plurality of fuel pegs including an injection hole through which fuel is discharged; and a peg support configured to be coupled to the fuel pegs to support the fuel pegs.

The combustor may further include a nozzle casing configured to enclose the nozzles. The fuel pegs may be arranged at positions spaced apart from each other in a circumferential direction of the casing. The peg support may be formed to extend in an annular shape.

The peg support may include a guide surface oriented toward a center of the nozzle casing and formed in a curved arc shape.

The peg support may include a first peg support and a second peg support. The first and second peg supports may be disposed at positions spaced apart from each other in a longitudinal direction of each of the fuel pegs.

A guide surface of the first peg support disposed at an inner position may have a curvature radius different from a curvature radius of a guide surface of the second peg support disposed at a position farther from the center of the nozzle casing than the first peg support.

A first curvature radius of the guide surface of the first peg support may be greater than a second curvature radius of the guide surface of the second peg support.

A cross-section of the peg support may have a streamlined shape.

The peg support may include a first curved surface protruding in a convex shape, and a second curved surface connected with the first curved surface and protruding in a convex shape, and the first curved surface and the second curved surface may form a first edge oriented toward a downstream side based on the flow of air and a second edge oriented toward an upstream side based on the flow of air.

The peg support may include a first peg support and a second peg support. The first and second peg supports may be disposed at positions spaced apart from each other in a longitudinal direction of each of the fuel pegs. A first center axis of the first peg support disposed at an inner position may be inclined relative to a second center axis of the second peg support disposed at a position farther from a center of the nozzle casing than the first peg support.

A first inclined angle that is an angle between the first center axis and an imaginary line passing through a center of each of the fuel pegs may be less than a second inclined angle that is an angle between the second center axis and the imaginary line.

The injection hole may be open in a direction in which the peg support extends.

According to an aspect of another exemplary embodiment, there is provided a gas turbine including: a compressor configured to compress air; a combustor configured to mix fuel with the air compressed by the compressor and combust a mixture of the fuel and the compressed air; and a turbine including a plurality of turbine blades configured to be rotated by combustion gas generated by the combustor. The combustor may include: a plurality of nozzles configured to eject fuel and air; a flow passage configured to guide a flow of air to be drawn into the nozzles; a plurality of fuel pegs configured to protrude into the flow passage, each of the plurality of fuel pegs including an injection hole; and a peg support configured to be coupled to support the fuel pegs.

The peg support may be formed to extend in an annular shape.

The combustor may include a nozzle casing configured to enclose the nozzles. The peg support may include a first peg support and a second peg support. A guide surface of the first peg support disposed at an inner position may have a curvature radius different from a curvature radius of a guide surface of the second peg support disposed at a position farther from the center of the nozzle casing than the first peg support.

The first and second peg supports may be disposed at positions spaced apart from each other in a longitudinal direction of each of the fuel pegs. A first center axis of the first peg support disposed at an inner position is inclined relative to a second center axis of the second peg support disposed at a position farther from a center of the nozzle casing than the first peg support.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
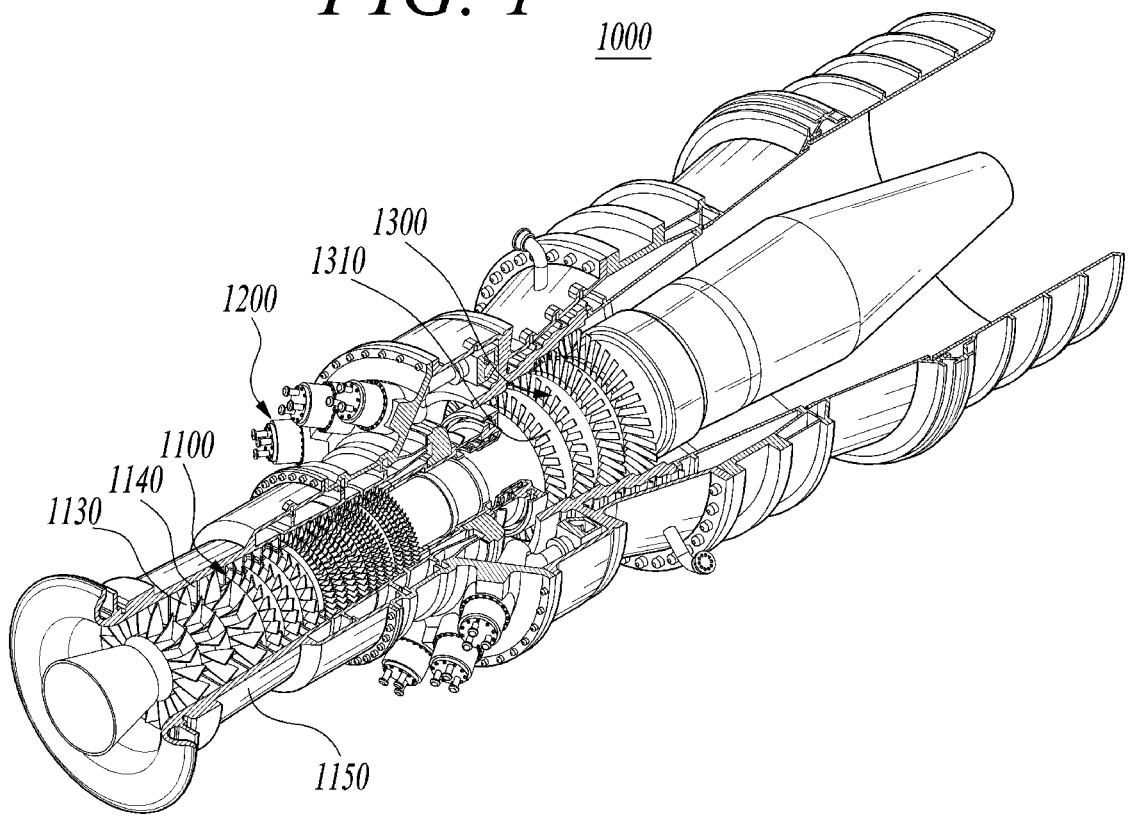
FIG. 1 is a diagram illustrating an internal structure of a gas turbine in accordance with an exemplary embodiment.

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
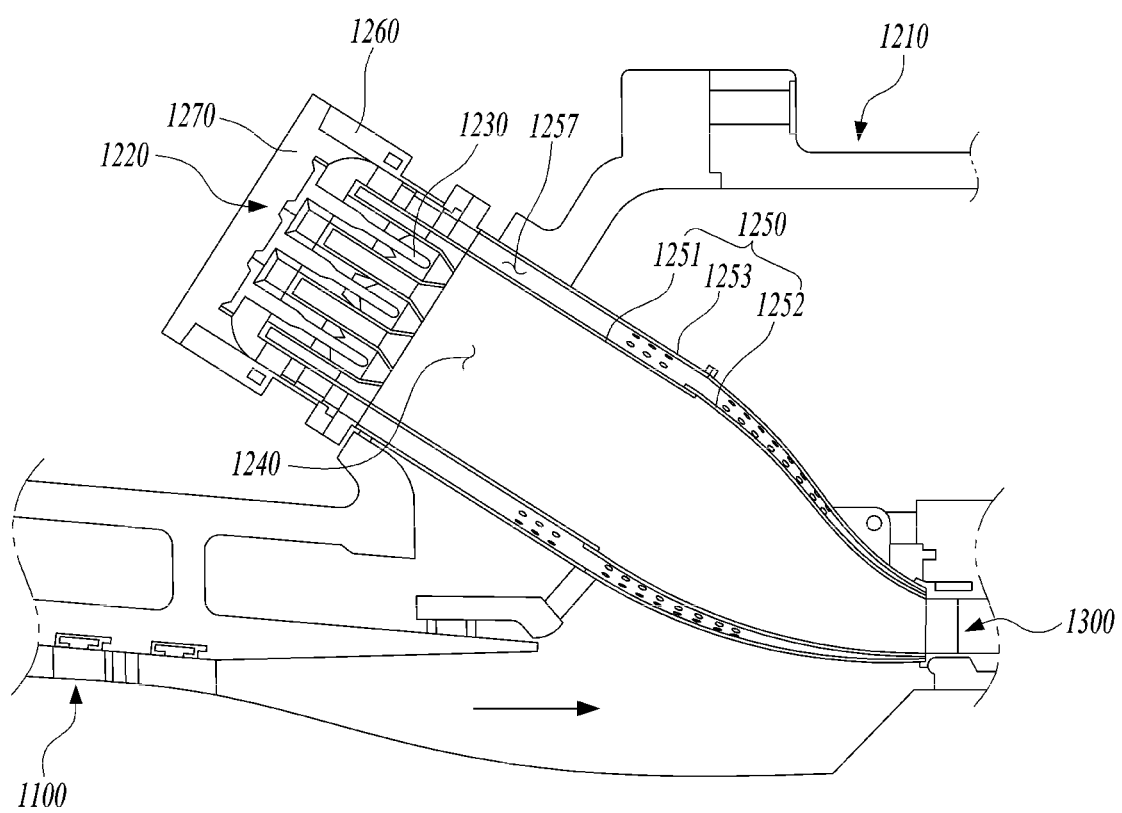
FIG. 2 is a diagram illustrating a combustor of FIG. 1.

FIG. 1 is a diagram illustrating an internal structure of a gas turbine in accordance with an exemplary embodiment, and FIG. 2 is a diagram illustrating a combustor of FIG. 1.

The thermodynamic cycle of the gas turbine 1000 in accordance with the exemplary embodiment may ideally comply with the Brayton cycle. The Brayton cycle may consist of four processes including an isentropic compression (i.e., an adiabatic compression) process, an isobaric heat supply process, an isentropic expansion (i.e., an adiabatic expansion) process, and an isobaric heat rejection process. In other words, the gas turbine may draw air from the atmosphere, compress the air to a high pressure, combust a fuel under isobaric conditions to emit a thermal energy, expand this high-temperature combustion gas to convert the thermal energy of the combustion gas into a kinetic energy, and discharge exhaust gas with residual energy to the atmosphere. As such, the Brayton cycle may consist of four processes including compression, heat addition, expansion, and heat rejection.

Embodying the Brayton cycle, the gas turbine 1000 may include a compressor 1100, a combustor 1200, and a turbine 1300, as illustrated in FIG. 1. Although the following description will be made with reference to FIG. 1, the description of the present disclosure may also be widely applied to a turbine engine having a configuration equivalent to that of the gas turbine 1000 illustrated in FIG. 1.

Referring to FIG. 1, the compressor 1100 of the gas turbine 1000 may draw an air from the outside and compress the air. The compressor 1100 may supply air compressed by compressor blades 1130 to the combustor 1200 and also supply air for cooling to a high-temperature region needed to be cooled in the gas turbine 1000. Here, drawn air is compressed in the compressor 1100 through an adiabatic compression process, so that the pressure and the temperature of air passing through the compressor 1100 are increased.

The compressor 1100 may be designed in the form of a centrifugal compressor or an axial compressor. Generally, the centrifugal compressor is used in a small gas turbine. On the other hand, in a large gas turbine such as the gas turbine 1000 illustrated in FIG. 1, a multi-stage axial compressor 1100 is used so as to compress a large amount of air. In the multi-stage axial compressor 1100, the compressor blades 1130 rotate along with rotation of a rotor disk, compress drawn air, and transfer compressed air to compressor vanes 1140 disposed at a following stage. Air is compressed gradually to high pressures while passing through the compressor blades 1130 formed in a multi-stage structure.

The compressor vanes 1140 may be mounted to an inner surface of a housing 1150 in such a way that a plurality of compressor vanes 1140 form each stage. The compressor vanes 1140 guide compressed air transferred from compressor blades 1130 disposed at a preceding stage toward compressor blades 1130 disposed at a following stage. For example, at least some of the plurality of compressor vanes 1140 may be mounted so as to be rotatable within a predetermined range, e.g., to adjust the flow rate of air.

The compressor 1100 may be operated using some of the power output from the turbine 1300. To this end, as illustrated in FIG. 1, a rotating shaft of the compressor 1100 may be directly coupled with a rotating shaft of the turbine 1300. In the case of the large gas turbine 1000, almost half of the output produced by the turbine 1300 may be consumed to drive the compressor 1100. Therefore, improvement in efficiency of the compressor 1100 may have a direct effect on increasing the overall efficiency of the gas turbine 1000.

The combustor 1200 may mix fuel with compressed air supplied from the compressor 1100 and combust the mixture through an isobaric combustion process to make combustion gas having high energy. FIG. 2 illustrates an example of the combustor 1200 applied to the gas turbine 1000. The combustor 1200 may include a combustor casing 1210, a burner 1220, and a duct assembly 1250.

In the gas turbine 1000, gas fuel, liquid fuel, or hybrid fuel formed by a combination of them may be used. It is important to form combustion conditions suitable for reducing the amount of exhaust gas such as carbon monoxide and nitrogen oxide. A pre-mixed combustion scheme has been used increasingly because a combustion temperature can be reduced and uniform combustion is possible so that exhaust gas can be reduced, although it is difficult to control the pre-mixed combustion.

In the pre-mixed combustion, compressed air is mixed with fuel ejected from the nozzles 1230 in advance, and then enters the combustion chamber 1240. Initial ignition of pre-mixed gas is performed by an igniter. Thereafter, if combustion is stabilized, the combustion is maintained by supplying fuel and air.

Referring to FIG. 2, compressed air flows along an outer surface of the duct assembly 1250, which is coupled between the burner 1220 and the turbine 1300 so that high-temperature combustion gas can flow through the duct assembly 1250, and then is supplied toward the nozzles 1230. During this process, the duct assembly 1250 heated by high-temperature combustion gas may be appropriately cooled.

The duct assembly 1250 may include a liner 1251, a transition piece 1252, and a flow sleeve 1253. The duct assembly 1250 has a double-shell structure, in which the flow sleeve 1253 encloses outer surfaces of the liner 1251 and the transition piece 1252 that are coupled to each other. Compressed air is drawn into a cooling passage 1257 formed inside the flow sleeve 1253, thus cooling the liner 1251 and the transition piece 1252.

The liner 1251 is a tube member coupled to the burner 1220 of the combustor 1200, and an internal space of the liner 1251 forms the combustion chamber 1240. One longitudinal end of the liner 1251 is coupled to the burner 1220, and the other longitudinal end of the liner 1251 is coupled to the transition piece 1252.

The transition piece 1252 is coupled to an inlet of the turbine 1300 and functions to guide high-temperature combustion gas into the turbine 1300. One longitudinal end of the transition piece 1252 is coupled to the liner 1251, and the other longitudinal end of the transition piece 1252 is coupled to the turbine 1300. The flow sleeve 1253 functions to protect the liner 1251 and the transition piece 1252 and to prevent high-temperature heat from being directly emitted to the outside.

A nozzle casing 1260 is coupled to an end of the duct assembly 1250. A head end plate 1270 for supporting the nozzles 1230 is coupled to the nozzle casing 1260.

The combustor casing 1210 may enclose the burners 1220 and have an approximately cylindrical shape. The burners 1220 may be disposed at a downstream side of the compressor 1100 and arranged along the combustor casing 1210 having an annular shape. A plurality of nozzles 1230 are provided in each burner 1220. Fuel ejected from the nozzles 1230 is mixed with air at an appropriate ratio to form a mixture having conditions suitable for combustion.

Figure 3:
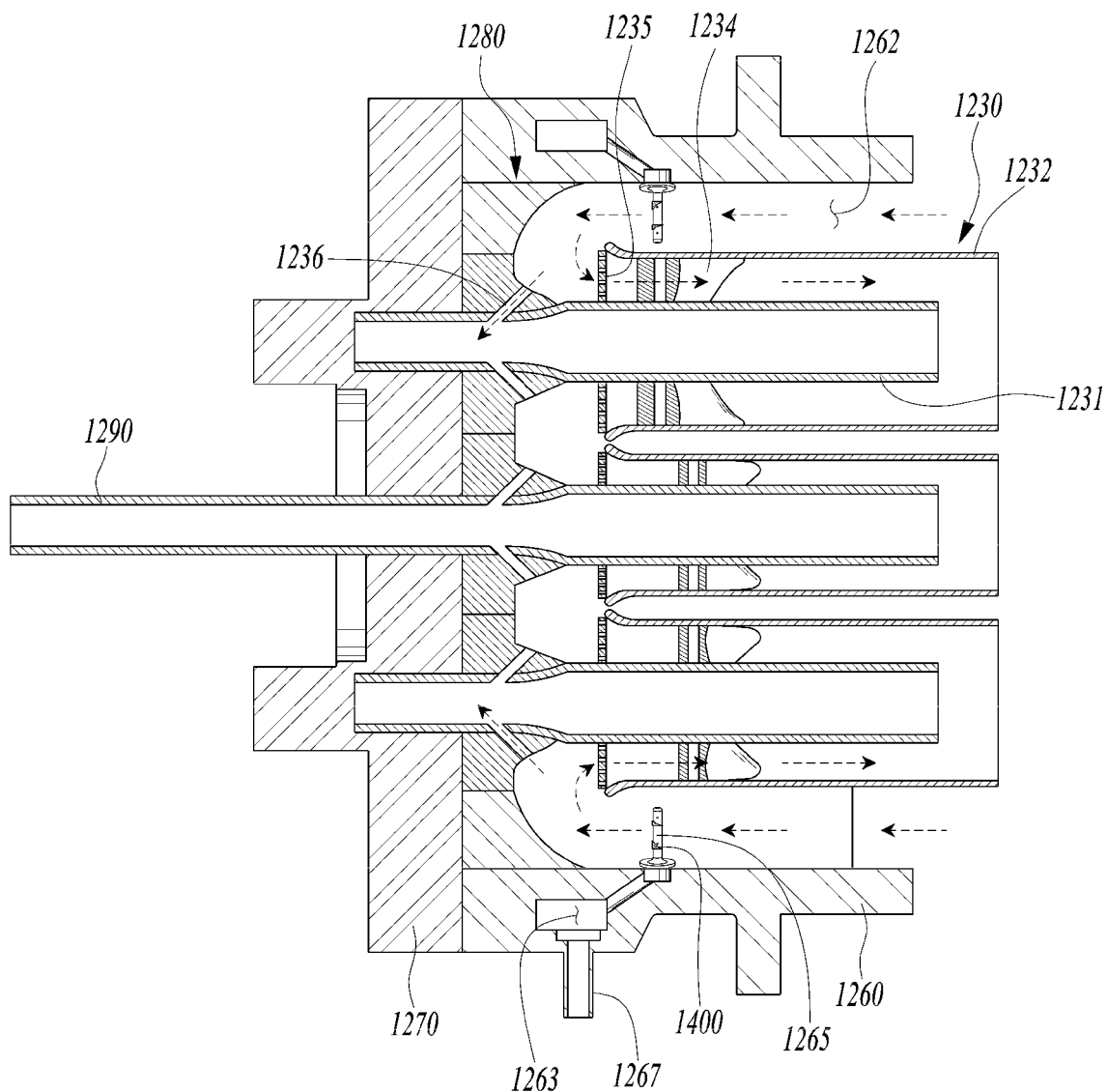
FIG. 3 is a sectional view illustrating a portion of a combustor in accordance with the exemplary embodiment.
Figure 4:
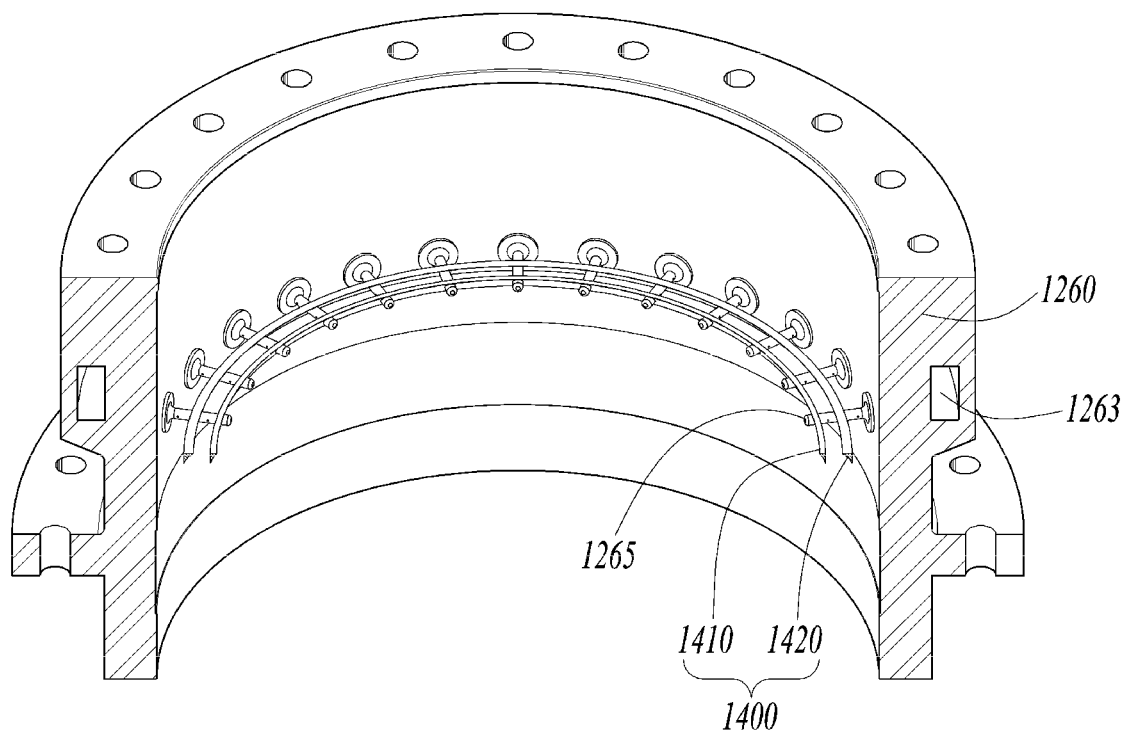
FIG. 4 is a sectional perspective view illustrating a nozzle casing and a fuel peg in accordance with the exemplary embodiment.

FIG. 3 is a sectional view illustrating a portion of the combustor in accordance with the exemplary embodiment, and FIG. 4 is a sectional perspective view illustrating a nozzle casing and a fuel peg in accordance with the exemplary embodiment.

Referring to FIGS. 3 and 4, the burner 1220 may include a plurality of nozzles 1230, a fuel peg 1265, a nozzle casing 1260, and a peg support 1400.

The nozzle casing 1260 is formed of an approximately circular tube and configured to enclose the plurality of nozzles 1230. One end of the nozzle casing 1260 is coupled to the duct assembly 1250, and the other end of the nozzle casing 1260 is coupled to the head end plate 1270.

The head end plate 1270 has a circular plate shape, and is coupled to the nozzle casing 1260 to support the plurality of nozzles 1230. The plurality of nozzles 1230 and a fuel injector 1290 for supplying fuel to the plurality of nozzles 1230 may be installed on the head end plate 1270.

Each of the nozzles 1230 may include a nozzle tube 1231, a nozzle shroud 1232 configured to enclose the nozzle tube 1231, and a swirler 1234 installed between the nozzle tube 1231 and the nozzle shroud 1232 and configured to eject fuel. The nozzle tube 1231 and the nozzle shroud 1232 form a coaxial structure. Fuel and air are supplied into the nozzle tube 1231. A passage along which air flows is formed in the nozzle shroud 1232, and fuel may be injected into the passage.

Air is drawn into a gap formed between the nozzle shroud 1232 and the nozzle tube 1231. A perforated plate 1235 for making the flow of air uniform may be installed in the gap. The swirler 1234 may induce swirls in the passage formed between the nozzle tube 1231 and the nozzle shroud 1232. A plurality of holes may be formed in the swirler 1234 so that fuel is ejected through the plurality of holes.

Air that flows along the cooling passage 1257 is drawn into the nozzle casing 1260 and reaches the head end plate 1270. Furthermore, air that is drawn into the gap between the nozzle tube 1231 and the nozzle shroud 1232 and air that is drawn into the nozzle tube 1231 through a supply passage 1236 are mixed with fuel, and thereafter are discharged into the combustion chamber 1240.

A flow guide member 1280 is disposed in a corner part on which a flow direction of air is changed, and guides the air such that the air may be easily drawn into the nozzles 1230. The flow guide member 1280 is installed on the corner part where the nozzle casing 1260 and the head end plate 1270 converge to guide the flow of air. The flow guide member 1280 may extend in the circumferential direction of the nozzle casing 1260 and have a ring shape, e.g., a circular annular shape.

A flow passage 1262 through which air flows may be formed between the nozzle casing 1260 and the nozzles

1230. Protruding into the flow passage 1262, the fuel peg 1265 may be installed in the nozzle casing 1260 to inject fuel into the flow passage 1262. A plurality of fuel pegs 1265 may be arranged at positions spaced apart from each other along a circumferential direction of the nozzle casing 1260. A peg support 1400 configured to support the fuel pegs 1265 is installed on the fuel pegs 1265.

Figure 5:
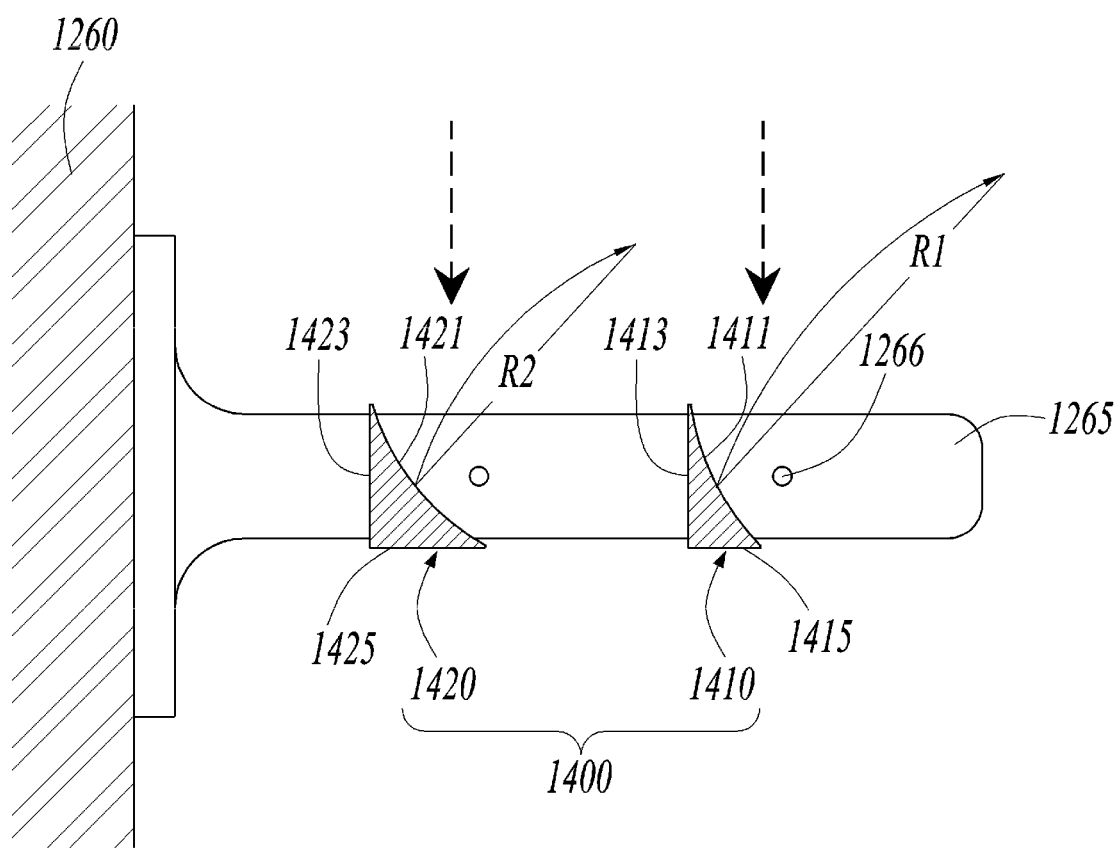
FIG. 5 is a sectional view illustrating the fuel peg and a peg support in accordance with the exemplary embodiment.

FIG. 5 is a sectional view illustrating the fuel peg and the peg support in accordance with the exemplary embodiment.

Referring to FIGS. 4 and 5, the fuel peg 1265 is stationarily installed to protrude inward from an inner surface of the nozzle casing 1260, and coupled with a manifold 1263 that is provided inside or outside the nozzle casing 1260 so that the fuel peg 1265 is supplied with fuel. Furthermore, a fuel injection tube 1267 is coupled to the manifold 1263 so that fuel can be supplied to the manifold 1263.

The fuel peg 1265 has an approximate rod shape, and a passage through which fuel flows is formed in the fuel peg 1265. At least one or more injection holes 1266 are formed in a side surface of the fuel peg 1265. The at least one or more injection holes 1266 are arranged at positions spaced apart from each other in a longitudinal direction of the fuel peg 1265. Each of the injection holes 1266 may eject fuel in a direction intersecting with the flow direction of air. Preferably, the injection holes 1266 may be formed such that fuel is ejected in a direction perpendicular to the flow direction of air. In detail, the injection holes 1266 may be open in a direction in which the peg support 1400 extends. Hence, fuel ejected from the injection holes 1266 may be easily mixed with air under guide of the peg support 1400.

The peg support 1400 supports the fuel pegs 1265 so that the fuel pegs 1265 can have structural stability, and extends in an annular shape. In other words, the peg support 1400 may have a circular annular shape.

The peg support 1400 includes a guide surface 1411, 1421 formed of a curved surface, and a first support surface 1413, 1423 and a second support surface 1415, 1425 which are coupled with the guide surface 1411, 1421. The first support surface 1413, 1423 and the second support surface 1415, 1425 may be perpendicularly coupled to each other. The first support surface 1413, 1423 is disposed to face the inner surface of the nozzle casing 1260. The second support surface 1415, 1425 is disposed at a rear end side of the peg support 1400 based on the flow direction of air. The guide surface 1411, 1421 faces the center of the nozzle casing 1260 and has a curved arc shape. The guide surface 1411, 1421 may be formed to face the center and a front portion of the nozzle casing 1260.

If the peg support 1400 is formed, vibration or wobble of the fuel pegs 1265 may be reduced. Furthermore, the guide surface 1411, 1421 may uniform the flow of air by guiding the flow of air and assist air drawn onto the flow guide member 1280 in being more reliably changed in direction by the flow guide member 1280. Hence, generation of swirl may be reduced, and the flow of air may be stably guided.

Two peg supports 1400 may be installed on the fuel peg 1265. The peg supports 1400 are disposed at positions spaced apart from each other in a longitudinal direction of the fuel peg 1265. The peg supports 1400 may include a first peg support 1410 disposed at an inner position, and a second peg support 1420 disposed at a position farther from the center of the nozzle casing 1260 than is the first peg support 1410.

Here, the guide surface 1411 of the first peg support 1410 and the guide surface 1421 of the second peg support 1420 may have different curvature radii. The guide surface 1411 of the first peg support 1410 has a first curvature radius R1. The guide surface 1421 of the second peg support 1420 has a second curvature radius R2. The first curvature radius R1 may be greater than the second curvature radius R2. For example, the first curvature radius R1 may be 1.1 to 1.5 times the second curvature radius R2.

As such, if the first curvature radius R1 is greater than the second curvature radius R2, the flow of outer air is guided to bend at a relatively large angle in advance so that the outer air compresses inner air, thus minimizing generation of swirl, and more effectively uniform a pre-mixed air. Thereby, the pre-mixed air may be more stably drawn into the nozzles 1230. Furthermore, because fuel and air are moved under the guide of the peg supports 1400, the fuel and the air may be more uniformly mixed with each other.

Air mixed with fuel ejected from the fuel pegs 1265 is changed in direction by the flow guide member 1280 and then drawn into the nozzles 1230. Here, if the peg supports 1400 are installed, the pre-mixed air may be more easily drawn into the nozzles 1230 without generation of swirl.

Hereinafter, a peg support in accordance with another exemplary embodiment will be described.

Figure 6:
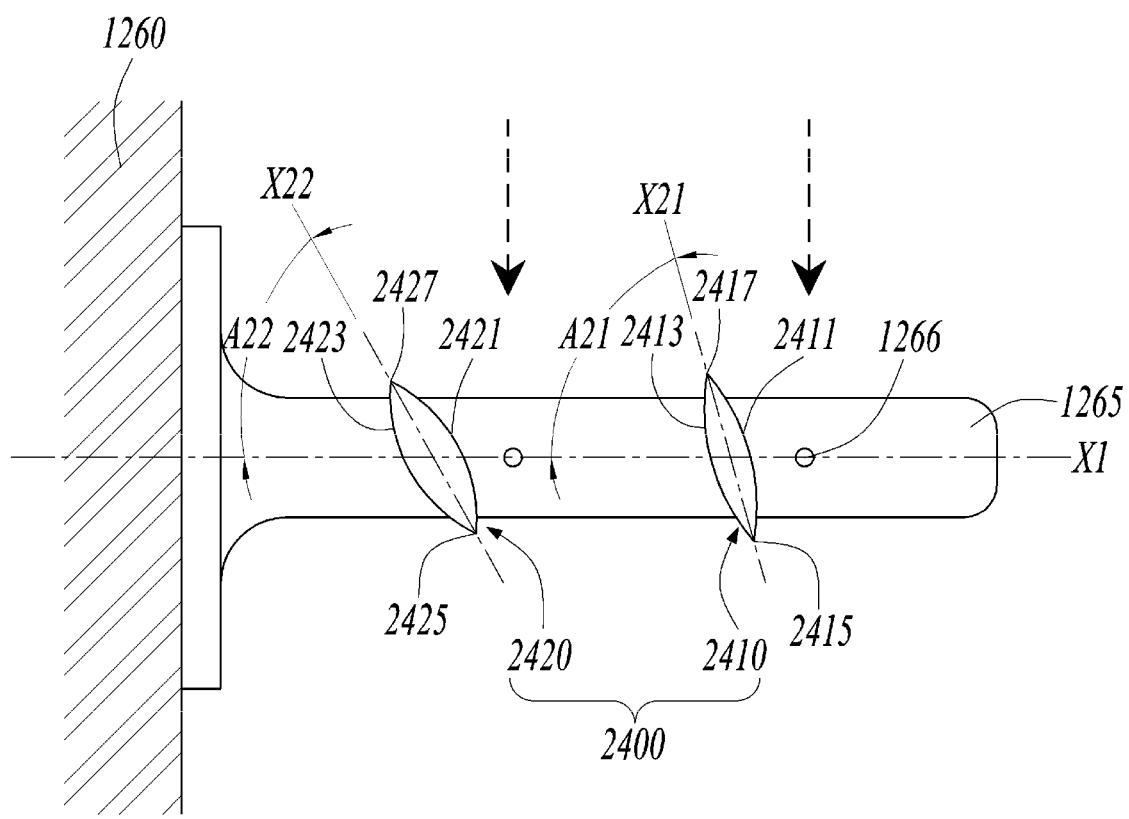
FIG. 6 is a sectional view illustrating a fuel peg and a peg support in accordance with another exemplary embodiment.

FIG. 6 is a sectional view illustrating a fuel peg and a peg support in accordance with another exemplary embodiment;

Referring to FIG. 6, a peg support 2400 supports fuel pegs 1265 so that the fuel pegs 1265 can have structural stability, and extends in an annular shape. The peg support 2400 may extend in an arc shape and be formed in a circular annular shape.

The peg support 2400 includes a first curved surface 2411, 2421 which protrudes in a convex shape, and a second curved surface 2413, 2423 which is connected with the first curved surface 2411, 2421 and protrudes in a convex shape. The first curved surface 2411, 2421 and the second curved surface 2413, 2423 form a first edge 2415, 2425 which is oriented toward a downstream side based on the flow direction of air, and a second edge 2417, 2427 which is oriented toward an upstream side based on the flow direction of air.

A center axis X21, X22 passing through the center of the peg support 2400 may be disposed to be inclined with respect to an imaginary line X1 passing through the center of the fuel peg 1265. Here, the center axis X21, X22 may correspond to a line connecting the first edge 2415, 2425 and the second edge 2417, 2427.

A plurality of peg supports 2400 may be installed on the fuel peg 1265. The peg supports 2400 are disposed at positions spaced apart from each other in a longitudinal direction of the fuel peg 1265.

The peg supports 2400 may include a first peg support 2410 disposed at an inner position, and a second peg support 2420 disposed at a position farther from the center of the nozzle casing 1260 than is the first peg support 2410. The first peg support 2410 may have a thickness less than that of the second peg support 2420.

In addition, when an angle between the first center axis X21 passing through the center of the first peg support 2410 and the imaginary line X1 passing through the center of the fuel peg 1265 is a first inclined angle A21, and an angle between the second center axis X22 passing through the center of the second peg support 2420 and the imaginary line X1 passing through the center of the fuel peg 1265 is a second inclined angle A22, the first inclined angle A21 may be greater than the second inclined angle A22. For example, the first inclined angle A21 may be 1.05 to 1.5 times the second inclined angle A22. Hence, the first center axis X21 and the second center axis X22 are inclined with respect to each other.

As such, if the peg supports 2400 are formed, vibration or wobble of the fuel pegs 1265 may be reduced. Furthermore, the side surfaces of the peg supports 2400 that are curved in arc shapes and protrude outward may uniform the flow of air and supply the air to the nozzles 1230. The peg supports 2400 that are inclined at different angles guide the flow of air so that outer air is compressed at a relatively large angle and thus compresses inner air, whereby generation of swirl may be minimized, and pre-mixed air may be more reliably uniformed and stably drawn into the nozzles.

Hereinafter, a peg support in accordance with another exemplary embodiment will be described.

Figure 7:
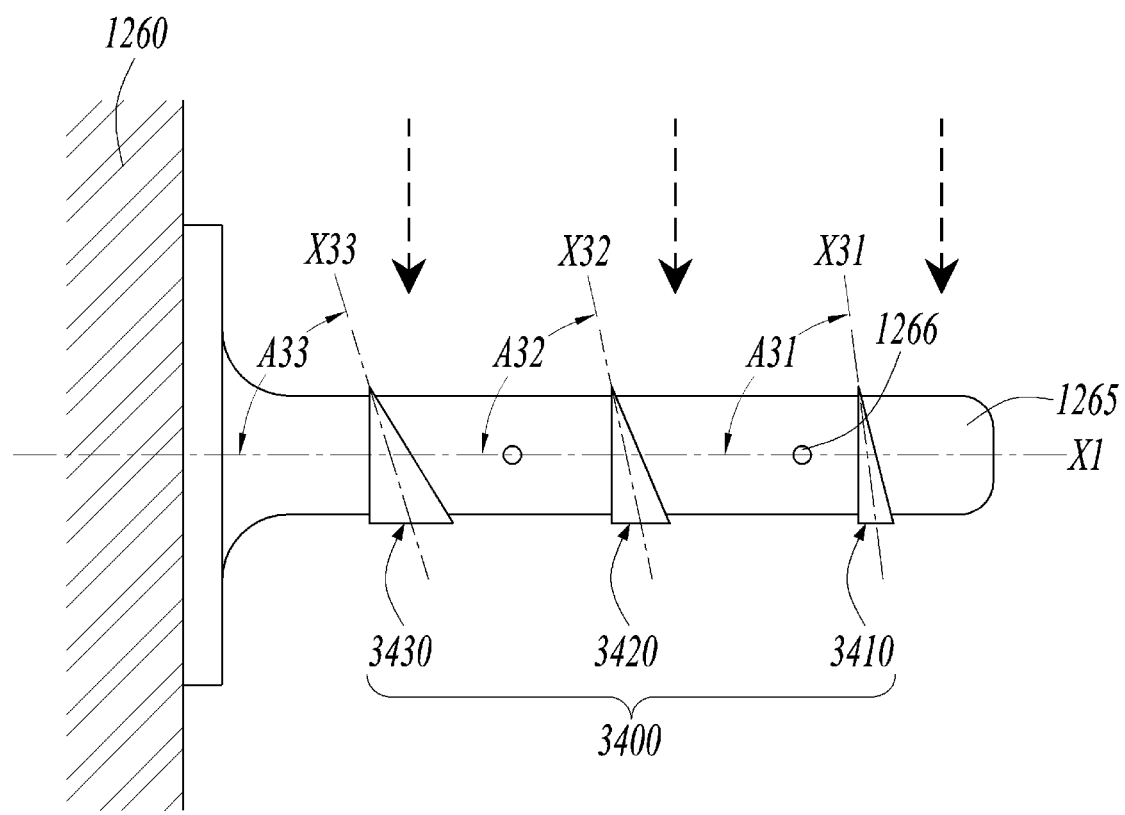
FIG. 7 is a sectional view illustrating a fuel peg and a peg support in accordance with another exemplary embodiment.

FIG. 7 is a sectional view illustrating a fuel peg and a peg support in accordance with another exemplary embodiment.

Referring to FIG. 7, a peg support 3400 supports fuel pegs 1265 so that the fuel pegs 1265 can have structural stability, and extends in an annular shape. The peg support 3400 may extend in an arc shape and be formed in a circular annular shape. A cross section of the peg support 3400 may have a triangular shape. A long side of the triangle may be disposed to be inclined with respect to an imaginary line X1 passing through the center of the fuel peg 1265.

A plurality of peg supports 3400 may be installed on the fuel peg 1265. The peg supports 3400 are disposed at positions spaced apart from each other in a longitudinal direction of the fuel peg 1265. The peg supports 3400 may include a first peg support 3410 disposed at an inner position, a second peg support 3420 disposed at a position farther from the center of the nozzle casing 1260 than is the first peg support 3410, and a third peg support 3430 disposed at a position farther from the center of the nozzle casing 1260 than is the second peg support 3420.

Here, injection holes 1266 may be formed between the first peg support 3410 and the second peg support 3420 and between the second peg support 3420 and the third peg support 3430. The first peg support 3410 may have a thickness less than that of the second peg support 3420. The second peg support 3420 may have a thickness less than that of the third peg support 3430.

Furthermore, when an angle between a first center axis X31 passing through the center of the first peg support 3410 and an imaginary line X1 passing through the center of the fuel peg 1265 is a first inclined angle A31, an angle between a second center axis X32 passing through the second peg support 3420 and the imaginary line X1 is a second inclined angle A32, and an angle between a third center axis X33 passing through the center of the third peg support 3430 and the imaginary line X1 is a third inclined angle A33, the first inclined angle A31 may be greater than the second inclined angle A32, and the second inclined angle A32 may be greater than the third inclined angle A33. For example, the first inclined angle A31 may be 1.05 to 1.5 times the second inclined angle A32, and the second inclined angle may be 1.05 to 1.5 times the third inclined angle A33. Hence, the first center axis X31, the second center axis X32, and the third center axis X33 may be inclined with respect to each other.

As such, if the peg supports 3400 are coupled to the fuel pegs 1265, vibration or wobble of the fuel pegs 1265 may be reduced. Furthermore, injected fuel may be more easily mixed with air compressed by the peg supports 3400.

In addition, the peg supports 3400 that are disposed to be inclined at different angles guide the flow of air. Here, outer air is compressed at a relatively large angle and thus compresses inner air, whereby generation of swirl may be minimized, and pre-mixed air may be more reliably uniformed, and stably drawn into the nozzles 1230.

Hereinafter, a peg support in accordance with another exemplary embodiment will be described.

Figure 8:
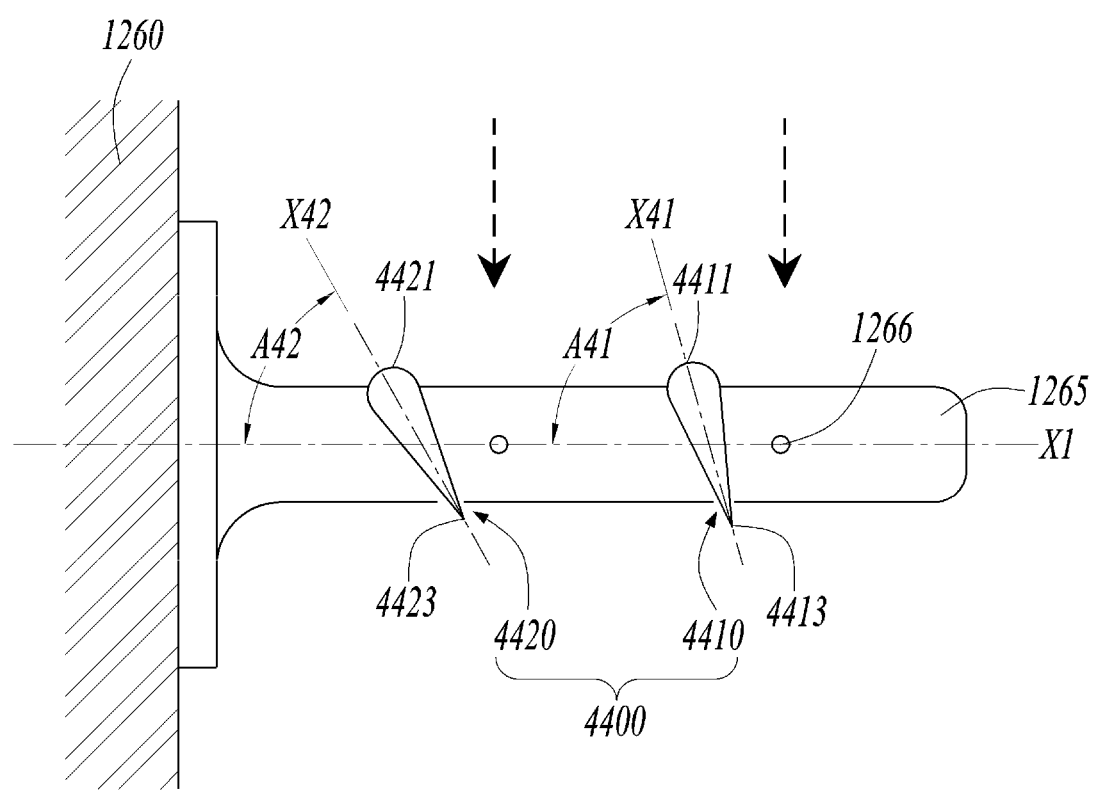
FIG. 8 is a sectional view illustrating a fuel peg and a peg support in accordance with another exemplary embodiment.

FIG. 8 is a sectional view illustrating a fuel peg and a peg support in accordance with another exemplary embodiment.

Referring to FIG. 8, a peg support 4400 supports fuel pegs 1265 so that the fuel pegs 1265 can have structural stability, and extends in an annular shape. The peg support 4400 may extend in an arc shape and be formed in a circular annular shape.

The peg support 4400 has an approximately streamlined cross-section, and includes a front end 4411, 4421 which is formed in a rounded shape toward an upstream side based on the flow of air, and an edge 4413, 4423 which is formed in a sharp shape toward a downstream side based on the flow of air.

A center axis X41, X42 passing through the center of the peg support 4400 may be disposed to be inclined with respect to an imaginary line X1 passing through the center of the fuel peg 1265. A plurality of peg supports 4400 may be installed on the fuel peg 1265. The peg supports 4400 are disposed at positions spaced apart from each other in a longitudinal direction of the fuel peg 1265. Furthermore, the peg supports 4400 may include a first peg support 4410 disposed at an inner position, and a second peg support 4420 disposed at a position farther from the center of the nozzle casing 1260 than is the first peg support 4410.

Here, injection holes 1266 may be formed at a position between the first peg support 4410 and the second peg support 4420 and at a position closer to the center of the nozzle casing 1260 than is the second peg support 4420.

In addition, when an angle between the first center axis X41 passing through the center of the first peg support 4410 and an imaginary line passing through the center of the fuel peg 1265 is a first inclined angle A41, and an angle between the second center axis X42 passing through the center of the second peg support 4420 and the imaginary line X1 is a second inclined angle A42, the first inclined angle A41 may be greater than the second inclined angle A42. For example, the first inclined angle A41 may be 1.05 to 1.5 times the second inclined angle A42. Hence, the first central axis X41 and the second central axis X42 are inclined with respect to each other.

As such, if the peg supports 4400 are coupled to the fuel pegs 1265, vibration or wobble of the fuel pegs 1265 may be reduced. Furthermore, injected fuel may be more easily mixed with air compressed by the peg supports 4400.

In addition, the peg supports 4400 that are disposed to be inclined at different angles guide the flow of air. Here, outer air is compressed at a relatively large angle and thus compresses inner air, whereby generation of swirl may be minimized, and pre-mixed air may be more reliably uniformed, and stably drawn into the nozzles.

As described above, a combustor and a gas turbine in accordance with an exemplary embodiment may not only stably support a fuel peg, but may also guide air so that uniformed air may be supplied to a nozzle.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A combustor comprising: a plurality of nozzles configured to eject fuel and air; a flow passage configured to guide a flow of air to be drawn into the nozzles; a plurality of fuel pegs configured to protrude into the flow passage, each of the plurality of fuel pegs including an injection hole through which fuel is discharged; a peg support configured to be coupled to the fuel pegs to support the fuel pegs and uniform the flow of air to a corner part; and a flow guide member disposed in the corner part to guide the flow of air transferred from the peg support, wherein the peg support comprises a first peg support and a second peg support, and the first and second peg supports are disposed at positions spaced apart from each other in a longitudinal direction of each of the fuel pegs, and wherein a guide surface of the first peg support disposed at an inner position has a curvature radius different from a curvature radius of a guide surface of the second peg support disposed at a position farther from a center of the nozzle casing than the first peg support.

2. The combustor according to claim 1, further comprising a nozzle casing configured to enclose the nozzles,
wherein the fuel pegs are arranged at positions spaced apart from each other in a circumferential direction of the nozzle casing, and
wherein the peg support is formed to extend in an annular shape.

3. The combustor according to claim 2, wherein at least one of the guide surface of the first peg support and the guide surface of the second peg support is oriented toward a center of the nozzle casing and formed in a curved arc shape.

4. The combustor according to claim 1, wherein the curvature radius of the guide surface of the first peg support is greater than the curvature radius of the guide surface of the second peg support.

5. The combustor according to claim 1, wherein a cross-section of the peg support has a streamlined shape.

6. A combustor comprising:
a plurality of nozzles configured to eject fuel and air;
a flow passage configured to guide a flow of air to be drawn into the nozzles;
a plurality of fuel pegs configured to protrude into the flow passage, each of the plurality of fuel pegs including an injection hole through which fuel is discharged; and
a peg support configured to be coupled to the fuel pegs to support the fuel pegs,
wherein the peg support includes a first curved surface protruding in a convex shape and a second curved surface connected with the first curved surface and protruding in a convex shape, and
wherein the first curved surface and the second curved surface form a first edge oriented toward a downstream side based on the flow of air and a second edge oriented toward an upstream side based on the flow of air.

7. The combustor according to claim 6,
wherein the peg support comprises a first peg support and a second peg support,
wherein the first and second peg supports are disposed at positions spaced apart from each other in a longitudinal direction of each of the fuel pegs, and
wherein a first center axis of the first peg support disposed at an inner position is inclined relative to a second center axis of the second peg support disposed at a position farther from a center of a nozzle casing than the first peg support.

8. The combustor according to claim 7,
wherein a first inclined angle that is an angle between the first center axis and an imaginary line passing through a center of each of the fuel pegs is less than a second inclined angle that is an angle between the second center axis and the imaginary line.

9. The combustor according to claim 1, wherein the injection hole is open in a direction in which the peg support extends.

10. A gas turbine comprising:
a compressor configured to compress air;
a combustor configured to mix fuel with the air compressed by the compressor and combust a mixture of the fuel and the compressed air; and
a turbine including a plurality of turbine blades configured to be rotated by combustion gas generated by the combustor,
wherein the combustor comprises:
a plurality of nozzles configured to eject the fuel and the air;
a flow passage configured to guide a flow of air to be drawn into the nozzles;
a plurality of fuel pegs configured to protrude into the flow passage, each of the plurality of fuel pegs including an injection hole;
a peg support configured to be coupled to the fuel pegs to support the fuel pegs and uniform the flow of air to a corner part; and
a flow guide member disposed in the corner part to guide the flow of air transferred from the peg support,
where in peg support includes a first curved surface protruding in a convex shape and a second curved surface connected with the first curved surface and protruding in a convex shape, and
wherein the first curved surface and the second curved surface from a first edge oriented toward a downstream side based on the flow of air and a second edge oriented toward an upstream side based on the flow of air.

11. The gas turbine according to claim 10,
wherein the combustor further comprises a nozzle casing configured to enclose the nozzles, and
wherein the peg support is formed to extend in an annular shape.

12. The gas turbine according to claim 11, wherein the peg support includes a guide surf ace oriented toward a center of the nozzle casing and formed in a curved arc shape.

13. The gas turbine according to claim 12,
wherein the peg support comprises a first peg support and a second peg support, and
wherein the first and second peg supports are disposed at positions spaced apart from each other in a longitudinal direction of each of the fuel pegs.

14. The gas turbine according to claim 10,
wherein a guide surface of the first peg support disposed at an inner position has a curvature radius different from a curvature radius of a guide surf ace of the second peg support disposed at a position farther from the center of a nozzle casing than the first peg support.

15. The gas turbine according to claim 10, wherein a cross-section of the peg support has a streamlined shape.

16. The gas turbine according to claim 10,
wherein the peg support comprises a first peg support and a second peg support, and
wherein the first and second peg supports are disposed at positions spaced apart from each other in a longitudinal direction of each of the fuel pegs, and
wherein a first center axis of the first peg support disposed at an inner position is inclined relative to a second center axis of a second peg support disposed at a position farther from a center of a nozzle casing than the first peg support.

17. The gas turbine according to claim 16,
wherein a first inclined angle that is an angle between the first center axis and an imaginary line passing through a center of each of the fuel pegs is less than a second inclined angle that is an angle between the second center axis and the imaginary line.

* * * * *